US012592073B2

(12) United States Patent
Kimita et al.

(10) Patent No.: US 12,592,073 B2
(45) Date of Patent: Mar. 31, 2026

(54) IMAGE PROCESSING DEVICE AND IN-VEHICLE CONTROL DEVICE

(71) Applicant: HITACHI ASTEMO, LTD., Hitachinaka (JP)

(72) Inventors: Kazuya Kimita, Tokyo (JP); Masato Imai, Tokyo (JP); Naoyuki Tashiro, Tokyo (JP); Kota Irie, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/704,152

(22) PCT Filed: Aug. 25, 2022

(86) PCT No.: PCT/JP2022/032105
§ 371 (c)(1),
(2) Date: Apr. 24, 2024

(87) PCT Pub. No.: WO2023/074103
PCT Pub. Date: May 4, 2023

(65) Prior Publication Data
US 2024/0412506 A1 Dec. 12, 2024

(30) Foreign Application Priority Data

Oct. 29, 2021 (JP) ................................. 2021-177943

(51) Int. Cl.
*G06V 10/98* (2022.01)
*G06V 20/56* (2022.01)
(Continued)

(52) U.S. Cl.
CPC .......... *G06V 10/993* (2022.01); *G06V 20/588* (2022.01); *H04N 17/002* (2013.01); *B60S 1/56* (2013.01); *G06V 2201/07* (2022.01)

(58) Field of Classification Search
CPC .............. G06V 10/993; G06V 20/588; G06V 2201/07; H04N 17/002; H04N 2013/0081;
(Continued)

(56) References Cited

U.S. PATENT DOCUMENTS 9,319,637 B2 * 4/2016 Lu ............................ H04N 7/18
10,525,937 B2 * 1/2020 Zhao ..................... B60S 1/0848
(Continued)

FOREIGN PATENT DOCUMENTS

JP 2007-293672 A 11/2007
JP 2008-197863 A 8/2008
(Continued)

OTHER PUBLICATIONS

International Search Report and Written Opinion in corresponding International Application No. PCT/JP2022/032105, dated Sep. 27, 2022 (10 pages).
(Continued)

*Primary Examiner* — Gims S Philippe
(74) *Attorney, Agent, or Firm* — Foley & Lardner LLP

(57) ABSTRACT

An image processing device includes: an input unit that acquires each photographed image from a plurality of cameras installed in a vehicle; a photographing state detection unit that detects whether a malfunction has occurred in a photographing state of each of the photographed images; a likelihood calculation unit that calculates, for each of the cameras, a likelihood indicating a degree of malfunction of the photographing state on the basis of each of the photographed images; and a likelihood update unit that updates the likelihood to a new likelihood on a basis of a determination obtained by integrating the likelihoods for each of the cameras calculated by the likelihood calculation unit, in
(Continued)

which the likelihood updated by the likelihood update unit is outputted as the likelihood for each of the cameras.

23 Claims, 11 Drawing Sheets

(51) Int. Cl.
 *H04N 17/00* (2006.01)
 *B60S 1/56* (2006.01)
(58) Field of Classification Search
 CPC ...... H04N 13/243; H04N 23/60; H04N 23/52; B60S 1/56; G08G 1/165; G08G 1/166; G08G 1/167; G08G 1/16; G06T 2207/10016; G06T 2207/30168; G06T 2207/30248; G06T 7/0002; G06T 2207/20076
 See application file for complete search history.

(56) References Cited

U.S. PATENT DOCUMENTS

| | | | | |
|---|---|---|---|---|
| 2008/0192984 | A1* | 8/2008 | Higuchi | G06V 20/56 |
| | | | | 382/104 |
| 2010/0320043 | A1 | 12/2010 | Yamasaki et al. | |
| 2014/0009616 | A1* | 1/2014 | Nakamura | H04N 23/60 |
| | | | | 348/148 |
| 2015/0298657 | A1* | 10/2015 | Kanter | B60S 1/0848 |
| | | | | 348/148 |
| 2018/0308364 | A1 | 10/2018 | Kume et al. | |
| 2021/0122294 | A1* | 4/2021 | Mandai | G06T 7/12 |

FOREIGN PATENT DOCUMENTS

| | | | |
|---|---|---|---|
| JP | 2009-197863 | A | 9/2009 |
| JP | 2013-012044 | A | 1/2013 |
| JP | 2014-115814 | A | 6/2014 |
| JP | 2016-162204 | A | 9/2016 |
| JP | 2017-084137 | A | 5/2017 |
| JP | 2017-087758 | A | 5/2017 |

OTHER PUBLICATIONS

Japanese Office Action issued in corresponding JP Application No. 2021-177943, dated Aug. 5, 2025 with English translation (8 Pages).

\* cited by examiner

○FRONT CAMERA 2a
– WATER DROPLET, 50%

○LEFT CAMERA 2l
– WATER DROPLET, 50%

○RIGHT CAMERA 2r
– WATER DROPLET, 60%

○REAR CAMERA 2b
– WATER DROPLET, 10%

UPDATE

○FRONT CAMERA 2a
– WATER DROPLET, 80%

○LEFT CAMERA 2l
– WATER DROPLET, 80%

○RIGHT CAMERA 2r
– WATER DROPLET, 90%

○REAR CAMERA 2b
– WATER DROPLET, 40%

WATER DROPLET R

WATER DROPLET R

WATER DROPLET R

OFRONT CAMERA 2a
− WATER FILM, 10%
− 15cm, 15cm

OREAR CAMERA 2b
− WATER FILM, 20%
− 20cm, 20cm

OLEFT CAMERA 2l
− WATER FILM, 10%
− 15cm

ORIGHT CAMERA 2r
− WATER FILM, 10%
− 15cm

UPDATE

OFRONT CAMERA 2a
− WATER FILM, 10%
− 15cm, 15cm

OREAR CAMERA 2b
− WATER FILM, 80%
− 20cm, 20cm

OLEFT CAMERA 2l
− WATER FILM, 10%
− 15cm

ORIGHT CAMERA 2r
− WATER FILM, 10%
− 15cm

WHITE LINE L

WATER FILM W

FIG. 9

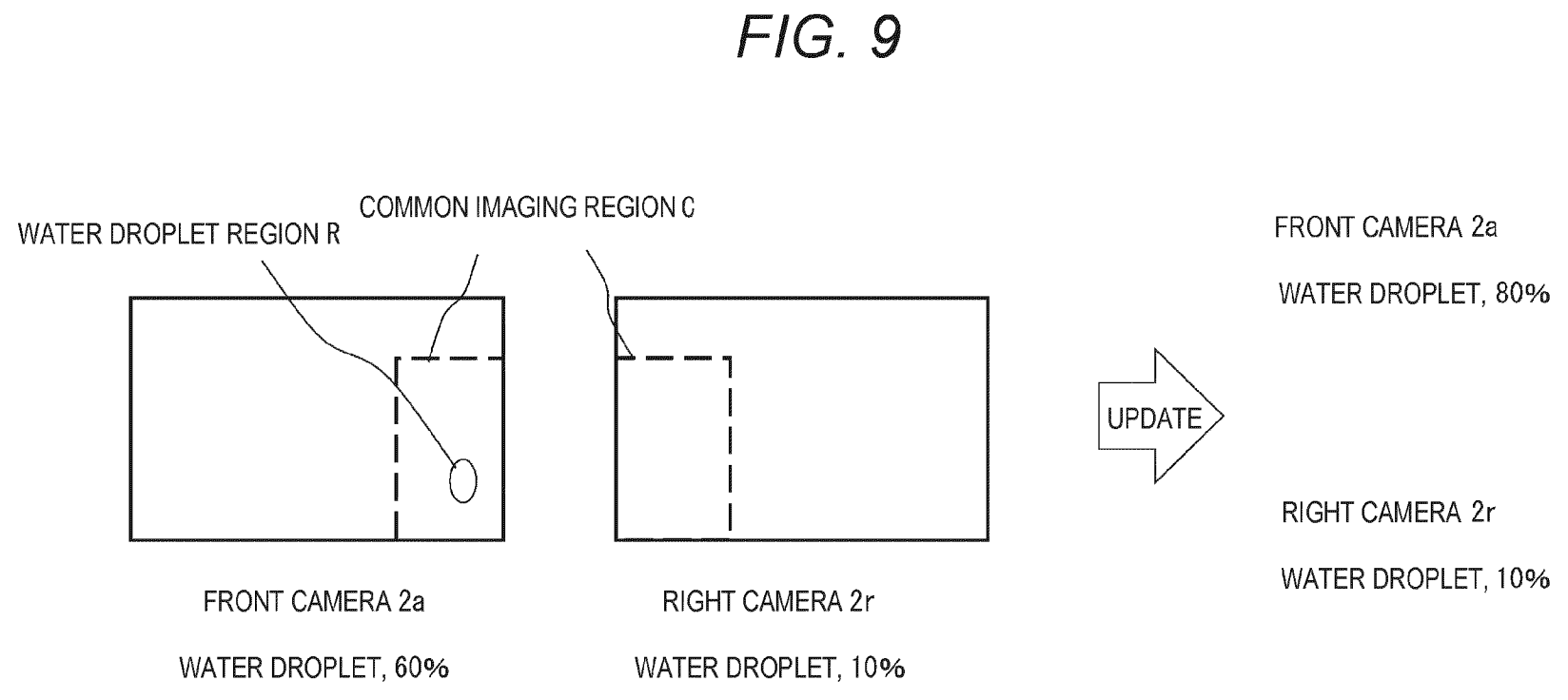

COMMON IMAGING REGION C

WATER DROPLET REGION R

FRONT CAMERA 2a
WATER DROPLET, 60%

RIGHT CAMERA 2r
WATER DROPLET, 10%

UPDATE

FRONT CAMERA 2a
WATER DROPLET, 80%

RIGHT CAMERA 2r
WATER DROPLET, 10%

IMAGE PROCESSING DEVICE AND IN-VEHICLE CONTROL DEVICE

TECHNICAL FIELD

The present invention relates to an image processing device and an in-vehicle control device.

BACKGROUND ART

In recent years, techniques for performing image recognition of an environment around a vehicle on the basis of photographed images of cameras installed in the vehicle and performing driving assistance on the basis of the recognition results have been developed. In image recognition processing, if there is a malfunction due to a water droplet, mud, backlight, or the like that interferes with recognition in a photographed image photographed by a camera, erroneous recognition, failed recognition, or the like sometimes occurs.

Therefore, a technique for detecting a camera malfunction from a photographed image has been devised. For example, in Patent Literature 1, halation is detected by luminance values in a photographed image by a camera, and water droplets and dirt are detected according to edge features. In addition, in Patent Literature 2, photographed images of the left and right cameras of a stereo camera are compared, and the presence of dirt is discriminated in regions of disparity other than parallax. In addition, in Patent Literature 3, reliability is defined from an image feature of a white line region, and the reliability histories of each camera are compared to discriminate that an abnormality has occurred in the lens of a camera having a relatively low reliability.

CITATION LIST

Patent Literature

PTL 1: JP 2008-197863 A
PTL 2: JP 2007-293672 A
PTL 3: JP 2014-115814 A

SUMMARY OF INVENTION

Technical Problem

In the technique disclosed in Patent Literature 1, in a case where the water film adheres to the entire camera lens, the influence of the adhesion of the water film does not appear in the edge feature, and thus, it is not possible to detect the adhesion of the water film. In the technique disclosed in Patent Literature 2, in a case where a water film is equally attached to the left and right cameras and a disparity other than parallax does not occur between the left and right photographed images, it is not possible to detect adherence of the water film. In such cases, the water film distorts light like a lens, and the water film adherence region on the photographed image by the camera appears enlarged, and hence a value different from the true value is calculated in image recognition processing or the like. With the technique disclosed in Patent Literature 3, there is the problem that it is not possible to improve the accuracy of a likelihood indicating that a malfunction has occurred in the photographing state of a photographed image.

Solution to Problem

The image processing device according to the present invention includes an input unit that acquires each photographed image from a plurality of cameras installed in a vehicle; a photographing state detection unit that detects whether a malfunction has occurred in a photographing state of each of the photographed images; a likelihood calculation unit that calculates, for each of the cameras, a likelihood indicating a degree of malfunction of the photographing state on the basis of each of the photographed images; and a likelihood update unit that updates the likelihood to a new likelihood on a basis of a determination obtained by integrating the likelihoods for each of the cameras calculated by the likelihood calculation unit, wherein the likelihood updated by the likelihood update unit is outputted as the likelihood for each of the cameras.

An in-vehicle control device according to the present invention includes an image processing device and a control processing device that executes processing control based on likelihood updated by the likelihood update unit.

Advantageous Effects of Invention

According to the present invention, it is possible to increase the accuracy of a likelihood indicating that a malfunction has occurred in a photographing state of a photographed image by a camera.

BRIEF DESCRIPTION OF DRAWINGS

FIG. 9 is a diagram illustrating likelihood update processing by a likelihood update unit according to an eighth embodiment.

DESCRIPTION OF EMBODIMENTS

Figure 1:
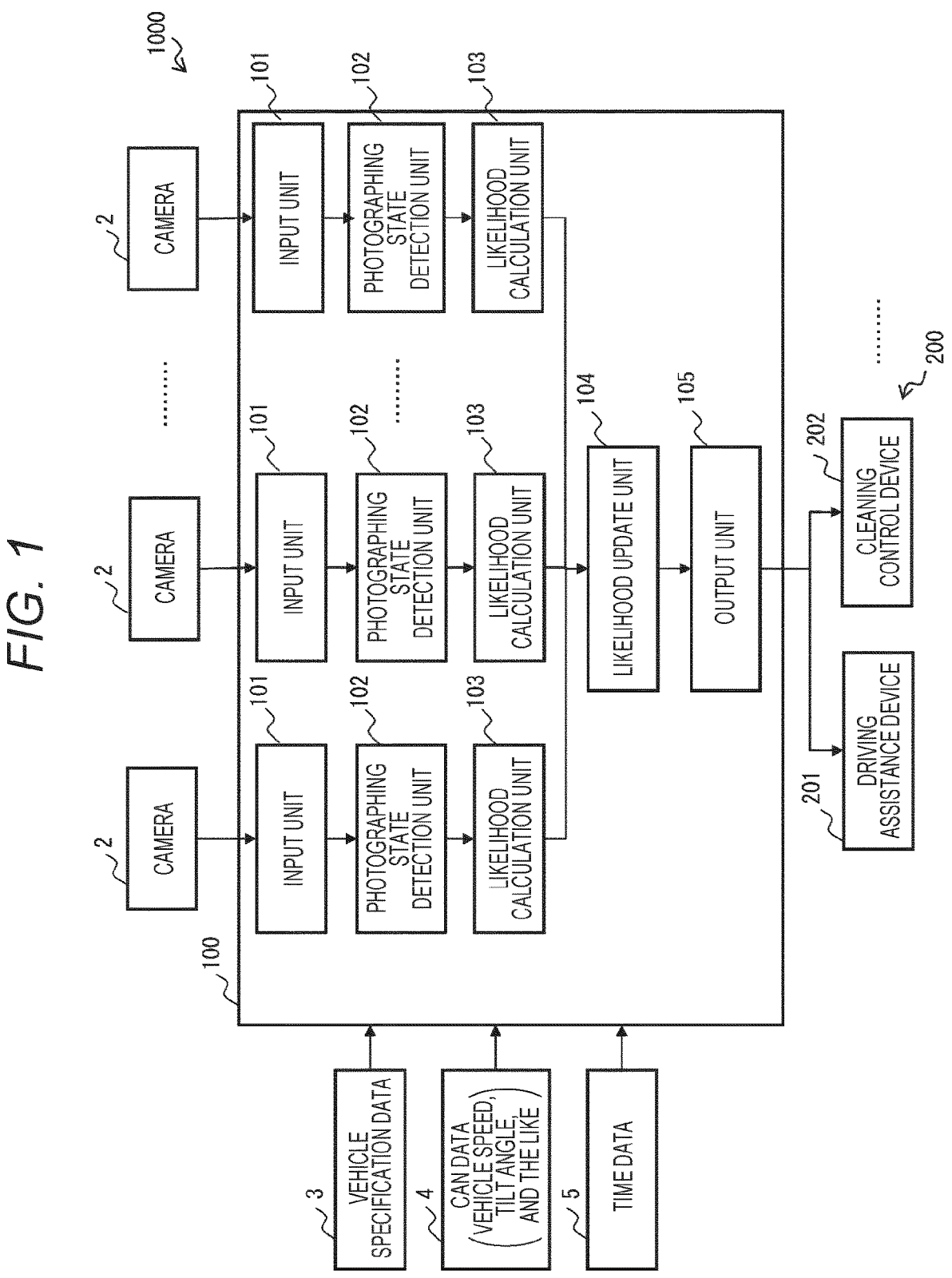
FIG. 1 is a configuration view of an in-vehicle control device according to a first embodiment.

Hereinafter, various embodiments of the present invention will be described with reference to the drawings. Note that the descriptions and drawings hereinbelow are examples to illustrate the present invention, and omissions and simplifications are made, as appropriate, to clarify the invention. The present invention can also be carried out in various other modes. Unless otherwise specified, each constituent element may be singular or plural.

In addition, in order to facilitate understanding of the invention, the position, size, shape, range, and the like of each constituent element illustrated in the drawings may not represent the actual position, size, shape, range, and the like. Therefore, the present invention is not necessarily limited to or by the position, size, shape, range, and the like disclosed in the drawings.

In a case where there is a plurality of components having the same or similar functions, same may be described with different subscripts added to the same reference signs. However, in a case where it is not necessary to distinguish between a plurality of constituent elements, descriptions may sometimes be provided with the subscripts omitted.

First Embodiment

FIG. 1 is a configuration view of an in-vehicle control device 1000 according to a first embodiment. The in-vehicle control device 1000 includes an image processing device 100 and a control processing device 200.

The image processing device 100 has a plurality of cameras 2 connected thereto, and acquires vehicle specification data 3, CAN (Controller Area Network) data 4, and time data 5. Details will be described below, but the image processing device 100 calculates and updates a likelihood indicating a degree of malfunction of a photographing state, and outputs the updated likelihood to the control processing device 200.

The cameras 2 are a plurality of in-vehicle cameras installed in the vehicle, and are installed at predetermined angles in predetermined mounting positions of the vehicle, for example, at the front and rear of the vehicle and on the left and right of the vehicle, and capture images around the vehicle. The camera 2 may be installed outside or inside the vehicle. The photographed images obtained by each camera 2 are outputted to the image processing device 100 via a transmission path such as a dedicated line, as analog data without further processing or after being A/D converted.

The vehicle specification data 3 includes information on the dimensions of the vehicle, the mounting position and angle of the cameras 2, the viewing angle, and the like, and these values are mainly used for calculation of likelihood in the image processing device 100, and the like. The vehicle specification data 3 may be acquired by incorporating a medium in which each value is recorded in the image processing device 100 or via a transmission path.

The CAN data 4 is vehicle information regarding vehicle behavior, such as vehicle speed, steering angle, and wiper operation information, and is inputted to the image processing device 100 via a controller area network (CAN). The image processing device 100 discriminates, using the inputted vehicle information, whether the vehicle is traveling, whether the vehicle is traveling straight, whether the vehicle is traveling on a bend, and the like.

The time data 5 is inputted from a GPS, a clock, or the like to the image processing device 100. The time data 5 is used when the image processing device 100 checks the chronological change in the photographed image photographed by the camera 2. The GPS, the clock, and the like may be built into the image processing device 100.

The image processing device 100 includes, in correspondence with each camera 2, an input unit 101, a photographing state detection unit 102, and a likelihood calculation unit 103. The image processing device 100 further includes a likelihood update unit 104 and an output unit 105.

The input unit 101 acquires the photographed image from the camera 2 and passes the photographed image to the photographing state detection unit 102.

The photographing state detection unit 102 analyzes each photographed image by each camera 2, and detects, for each camera 2, whether a malfunction has occurred in the photographing state. In a case where the photographing state is not good, it is detected that the camera 2 which photographed the photographed image is malfunctioning. Further, in a case where a malfunction has occurred, the type of malfunction causing the malfunction is discriminated. Types of malfunction include, for example, adhesion of water droplets, a water film, mud, snow, and the like, as well as backlighting, and the like. For the purpose of such detection and discrimination, the position on the photographed image, the size of the region, and so forth may be obtained, and on the basis of the position and size, and so forth, the occurrence of a malfunction and the type of malfunction may be discriminated. Note that a known technique can be used to detect a deposit on a lens or the like of the camera 2, and to detect backlight.

The likelihood calculation unit 103 calculates, for each camera 2, a likelihood indicating a degree of malfunction of a photographing state for each type of malfunction on the basis of each photographed image by each camera 2 detected by the photographing state detection unit 102. The likelihood is a value indicating to what extent the photographing state is regarded as a malfunction. This likelihood can be calculated from the photographing state of a photographed image through machine learning or a known photographing state determination technique using an image feature. In the present embodiment, the likelihood is expressed as a percentage %. For example, if the likelihood is 80%, the possibility of a malfunction is considered to be high. If the likelihood is 20%, the possibility of a malfunction is considered to be low. If the likelihood is 0%, the possibility of a malfunction is considered to be extremely low (alternatively, normal). Note that the likelihood is not limited to a percentage %, and may be indicated using other units or values.

The likelihood update unit 104 updates the likelihood calculated by the likelihood calculation unit 103 to a new likelihood on the basis of a determination made by integrating the likelihoods of each camera 2. For example, in a case where there is a plurality of cameras 2 on which a water droplet is detected, the likelihoods of each camera 2 are integrated to determine that the vehicle is traveling in rainy weather or immediately after a car wash, and the likelihood of a water droplet-related photographing state of the camera 2 for which a water droplet is detected is increased to obtain new likelihoods for the cameras 2.

The output unit 105 outputs the new likelihood updated by the likelihood update unit 104 to the control processing device 200 as the likelihood for each camera 2. At this time, in a case where a malfunction occurs, the type of malfunction or the position and region on the photographed image by the camera 2 in which the malfunction occurs may be outputted for each camera 2.

The control processing device 200 is a driving assistance device 201, a cleaning control device 202, or the like, and executes processing control on the basis of the updated likelihood. For example, discrimination of whether various types of malfunction have occurred in the photographing states of the cameras 2 is performed on the basis of the updated likelihood. In addition, the processing control is changed according to the updated likelihood.

The driving assistance device 201 recognizes, on the basis of photographed images photographed by the cameras 2, various objects such as surrounding vehicles, two-wheeled vehicles, pedestrians, bicycles, stationary objects, signs, white lines, curbstones, and guardrails, and issues a warning to the user or controls the behavior of the vehicle on the basis of the recognition result and the updated likelihood. Note that the region on the photographed image by the camera 2 where recognition is to be performed is different for each target object. In particular, the driving assistance device 201 refers to the likelihood outputted from the image processing device 100, and performs processing continuation or interruption, function degeneration to restrict the driving assistance function in stages, and the like.

For example, the driving assistance device 201 executes driving assistance processing control in a case where the updated likelihood is lower than a threshold value. Because it is considered that the degree of influence of the malfunction varies depending on the object of image recognition, the threshold value is set for each recognition object and for each type of malfunction. For example, in a case where a lane deviation warning device based on a white line detection result t obtained from image recognition processing is considered, in a case where the likelihood of a malfunction is higher than a predetermined threshold value, it may be discriminated that the image recognition processing cannot operate normally and the warning processing may be simply stopped, or even in a case where the likelihood of malfunction is higher than the predetermined threshold value, a determination may be made whether to stop or continue the warning processing on the basis of whether or not there is an overlap between a region on a photographed image used for white line detection and a region where a malfunction has occurred.

The cleaning control device 202 includes a wiper that wipes water droplets and the like on a glass surface of an optical system input/output device such as the camera 2, a washer that cleans dirt, and the like. Further, the start, continuation, end, and the like of wiping and cleaning are controlled on the basis of the likelihood and the like outputted from the image processing device 100. The optical system input/output device is the camera 2, a headlight, a backlight, a drive recorder, or the like.

For example, in a case where the updated likelihood is higher than a threshold value, the cleaning control device 202 executes control for cleaning an optical system input/output device provided to the vehicle. Specifically, the wiper attached to the target camera 2 is operated in a case where the likelihood of a water droplet or a water film is higher than a predetermined threshold value, and the washer is operated in a case where the likelihood of mud is higher than another predetermined threshold value.

As described above, because the likelihood of the photographing state is an important parameter that determines the behavior of the processing control by the control processing device 200 such as the driving assistance device 201 and the cleaning control device 202, it is necessary to calculate the likelihood highly accurately. In the present embodiment, as will be described below, it is possible to improve the accuracy of a likelihood indicating that a malfunction has occurred in the photographing state of the photographed image by the camera.

Figure 2:
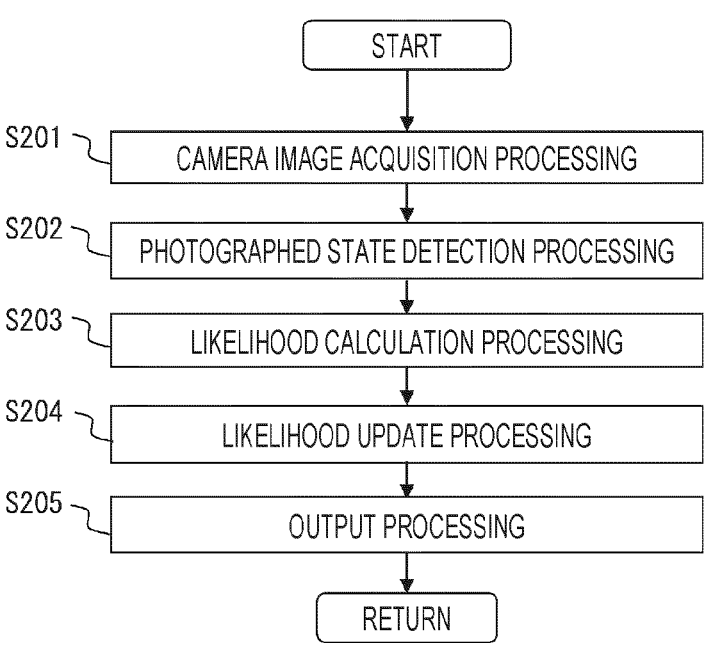
FIG. 2 is a flowchart showing processing of an image processing device according to the first embodiment.

FIG. 2 is a flowchart illustrating processing of the image processing device 100.

In processing S201, a photographed image by each camera 2 is acquired from the input unit 101.

In processing S202, the photographing state detection unit 102 detects the photographing state (normal, water droplet, water film, mud, snow, backlight, etc.) of each camera 2 from the acquired photographed image of each camera 2. In a case other than a normal case, that is, in a case where the occurrence of a malfunction of the camera 2 is discriminated, the region on the photographed image by the camera 2 in which the malfunction occurred is specified, and the position, size, and the like of water droplets, water films, mud, snow, backlight, and the like are extracted to detect the photographing state. A known technique can be used to specify the photographing state.

In processing S203, the likelihood calculation unit 103 calculates the likelihoods of the detected photographing states of the cameras 2.

In processing S204, the likelihood update unit 104 updates the likelihood of each photographing state of each camera 2 on the basis of the determination obtained by integrating the likelihoods of the respective photographing states of the cameras 2. Details of the likelihood update will be described below.

In processing S205, the output unit 105 outputs the updated likelihood of each photographing state of each camera 2 to the control processing device 200.

Figure 3:
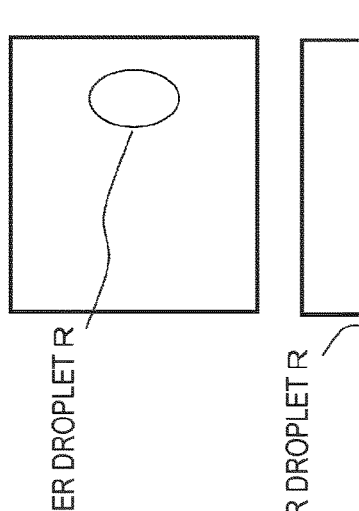
FIG. 3 is a diagram illustrating likelihood update processing by a likelihood update unit according to the first embodiment.
Figure 3:
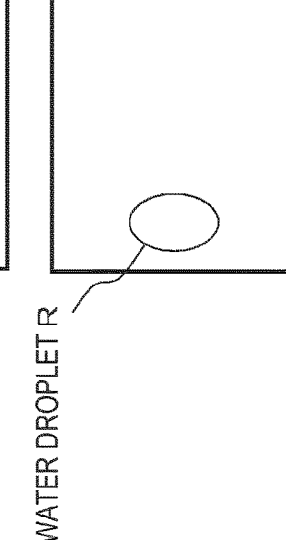
Figure 3:
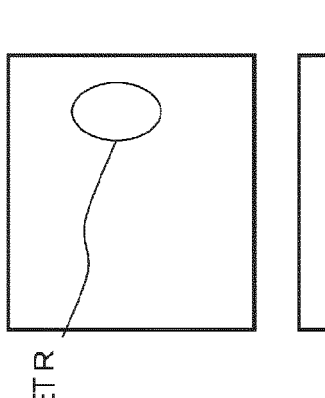
Figure 3:
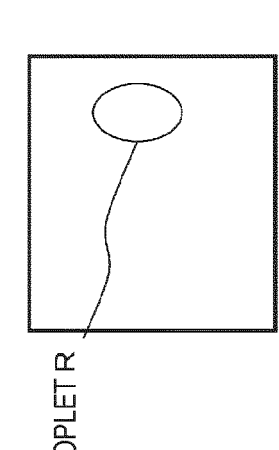

FIG. 3 is a diagram illustrating likelihood update processing by the likelihood update unit 104. In a case where there is a plurality of cameras 2 in which malfunction of the same type is detected by the photographing state detection unit 102, the likelihood update unit 104 updates the likelihood of the photographing state of each camera 2.

In the example of FIG. 3, the four cameras 2a, 2b, 2l, and 2r on the front, back, left, and right sides are connected to the image processing device 100, and the likelihoods discriminated in the processing S203 are: the likelihood of a water droplet R on the front camera 2a is 50%; the likelihood of a water droplet R on the left camera 2l is 50%; the likelihood of a water droplet R on the right camera 2r is 60%; and the likelihood of a water droplet R on the rear camera 2b is 10%. At this time, for example, in a case where the likelihood is equal to or more than 50%, it is discriminated that there is a possibility of water droplet adhesion, and in a case where there is a plurality of cameras for which water droplet adhesion is possible, water droplet adhesion is discriminated during travel in rainy weather or immediately after a car wash, and the likelihood of a water droplet R on each of the cameras 2a, 2b, 2l, and 2r is increased by 30%. The likelihoods of the cameras 2a, 2b, 2l, and 2r thus updated are outputted from the image processing device 100. However, an increment of 30% for the water droplet R likelihood is an example, and an appropriate increment is determined using actual data. In addition, in the example of FIG. 3, the increments of the water droplet R likelihoods of each camera 2 are set to be equal. However, for example, an increment of the likelihood of photographing state by the front camera 2a and the rear camera 2b which is often used for a later-stage function such as a lane departure warning may be set to be larger than the likelihood increment of the left camera 2l and the right camera 2r.

Note that the condition for updating the likelihood is not limited to the number of cameras 2 for which water droplet adhesion is possible, and for example, using CAN data wiper information, the high probability of rainy weather or after a car wash may be discriminated during a wiper operation, and thus the likelihood of water droplets or a water film may be increased. Furthermore, it is predicted that, not only water droplets and water films, but also, for example, mud will adhere to a plurality of cameras 2 by wicking up during travel on an unpaved road, and it is predicted that snow will adhere to the plurality of cameras 2 in the course of travel during snowfall. Therefore, similarly for such malfunctions, the likelihood may be increased in a case where there is a plurality of cameras 2 for which the probability of adhesion is high.

As described above, by updating the likelihood on the basis of a determination that integrates likelihoods based on the photographed images of each camera 2, the accuracy of the likelihood based on the photographed images of each camera 2 can be improved, and thus, in the processing control by the control processing device 200, which is later-stage processing, erroneous processing control caused by the photographing state of the camera 2 can be avoided.

Second Embodiment

Figure 4:
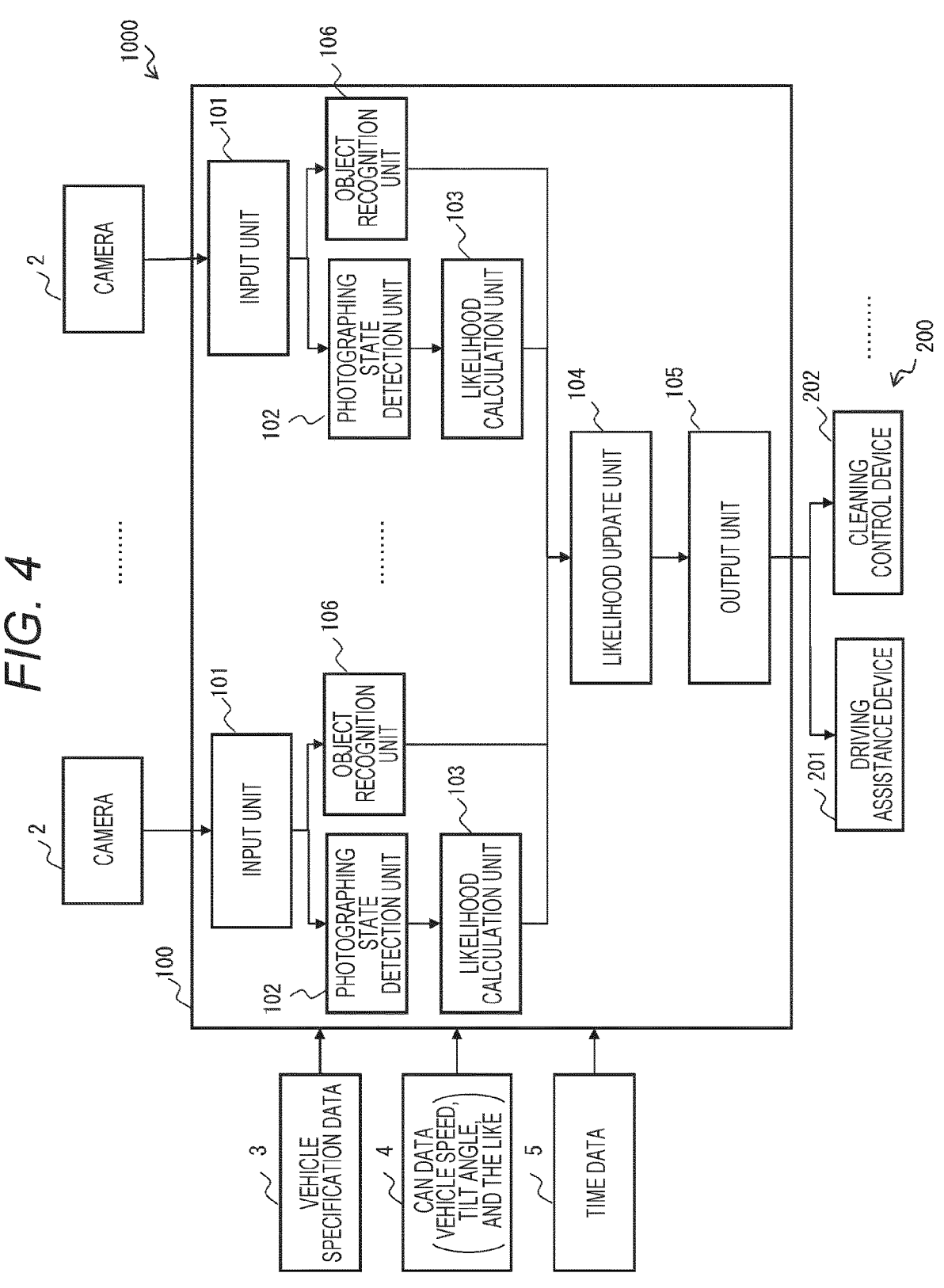
FIG. 4 is a configuration view of an in-vehicle control device according to a second embodiment.

FIG. 4 is a configuration view of an in-vehicle control device 1000 according to a second embodiment. The second embodiment is different from the first embodiment in that a target recognition unit 106 is provided. The same parts as those of the first embodiment illustrated in FIG. 1 are denoted by the same reference signs, and a description thereof will be omitted.

As illustrated in FIG. 4, the image processing device 100 includes the input unit 101, the photographing state detection unit 102, the likelihood calculation unit 103, the likelihood update unit 104, the output unit 105, and the target recognition unit 106, respectively.

The target recognition unit 106 recognizes a target such as a white line, a sign, a curbstone, or a guardrail present on each photographed image by the plurality of cameras 2. A known technique can be used for the recognition processing of each target. The target recognition result by the target recognition unit 106 is outputted to the likelihood update unit 104.

In a case where there is a plurality of cameras 2 for which a malfunction of the same type is detected by the photographing state detection unit 102, the likelihood update unit 104 compares the target recognition results for each camera 2 and updates the likelihood of the photographing state by each camera 2.

Figure 5:
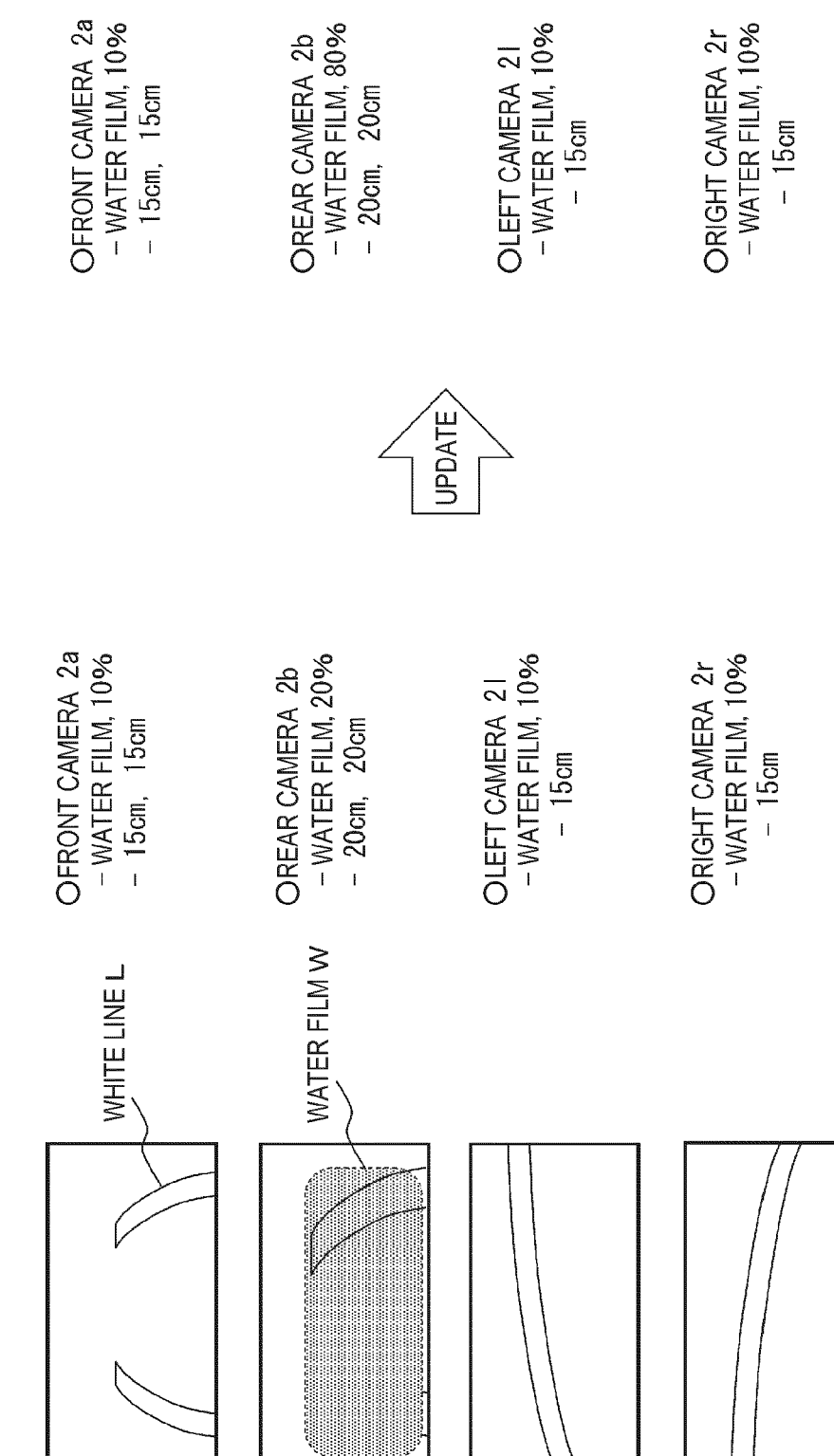
FIG. 5 is a diagram illustrating likelihood update processing by a likelihood update unit according to the second embodiment.

FIG. 5 is a diagram illustrating likelihood update processing by the likelihood update unit 104.

In the example of FIG. 5, four cameras 2a, 2b, 2l, and 2r on the front, rear, left, and right sides of the vehicle are connected to the image processing device 100. In a case where a water film W attached to the lens of the rear camera 2b or the window of the vehicle appears on the photographed image and where the image is photographed in a state where the water film W distorts light like the lens, the water film adhesion region on the photographed image by the rear camera 2b is enlarged. However, in a case where the likelihood is not updated, an erroneous operation is sometimes performed in the later-stage processing control, and it is difficult for a single camera 2 to detect the water film.

In the present embodiment, the likelihood update unit 104 compares the width of a white line L recognized by the target recognition unit 106 among the cameras 2a, 2b, 2l, and 2r, and, on the basis of the comparison result, updates the likelihood of a water film W-related photographing state by the rear camera 2b. Specifically, as illustrated in FIG. 5, it is assumed that the likelihood calculation unit 103 obtains the likelihoods of the photographing states of the four front, rear, left, and right cameras 2a, 2b, 2l, and 2r, and that the target recognition unit 106 obtains the white line widths on the photographed images photographed by the cameras 2a, 2b, 2l, and 2r.

Specifically, the likelihood calculated by the likelihood calculation unit 103 is 20% only for the rear camera 2b, and 10% for each of the other cameras 2a, 2l, and 2r. The width of the white line L by the target recognition unit 106 is 20 cm only in the rear camera 2b, and 15 cm in each of the other cameras 2a, 2l, and 2r. In this case, because the width of the white line L is 20 cm only for the rear camera 2b and 15 cm for each of the other cameras 2a, 2l, and 2r, the likelihood update unit 104 discriminates that there is a possibility of the water film W adhering to the rear camera 2b, and increases the likelihood of the water film W of the rear camera 2b from 20% to 80%. It is thus possible to suppress the influence of the adhesion of the water film W of the rear camera 2b in later-stage processing control. However, the increment of 60% of the likelihood of the water film W is an example, and an appropriate increment is determined using actual data.

Note that, in a case where the water film W adheres similarly to all the cameras 2 connected to the image processing device 100, there is no difference even if the recognition results of the widths of the white lines L in the respective cameras 2 are compared, and thus it is difficult to detect the water film W. However, because a prescribed value defined by law exists in the width of the white line L, it is possible to update the likelihood that the water film W may adhere to the camera 2 that has recognized a width of the white line L that deviates from the prescribed value.

Thus, the likelihood update unit 104 updates the likelihood of the photographing state by comparing the target recognition result by the target recognition unit 106 between the cameras 2. Specifically, the adhesion of the water film W, which is difficult to detect using a single camera 2, is discriminated in an integrated manner from the target recognition results of a plurality of cameras 2, by taking, for example, the target recognition results of a large number of cameras 2 as positive. Therefore, by updating the likelihood of the water film W photographing state by the camera 2 for which there is a possibility of adhesion of the water film W, it is possible to avoid erroneous processing control caused by the photographing state of the camera 2 in the processing control by the control processing device 200, which is later-stage processing.

Third Embodiment

Figure 6:
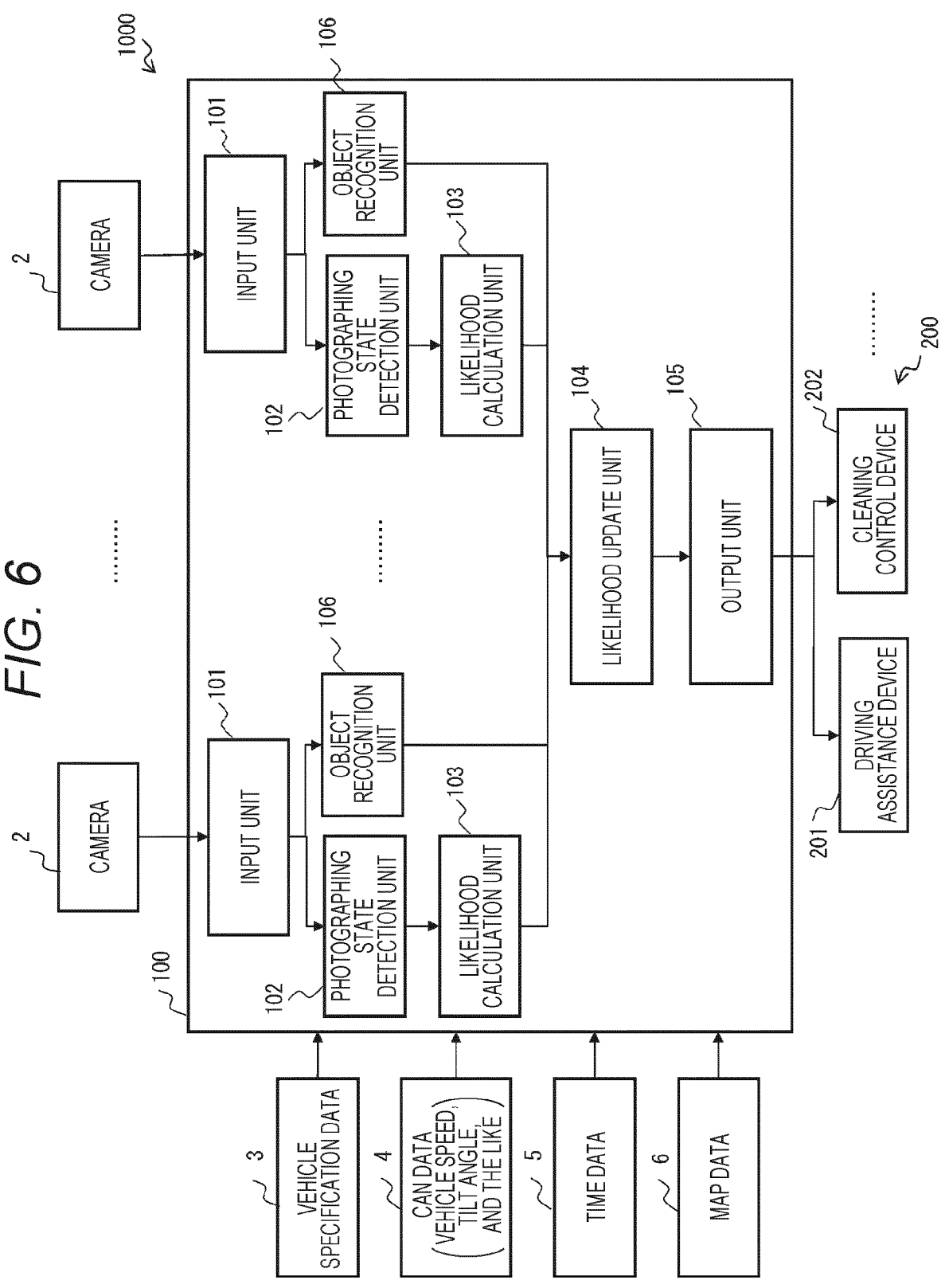
FIG. 6 is a configuration view of an in-vehicle control device according to a third embodiment.

FIG. 6 is a configuration view of an in-vehicle control device 1000 according to a third embodiment. The third embodiment is different from the second embodiment in that reference is made to map data 6. The same parts as those of the second embodiment illustrated in FIG. 4 are denoted by the same reference signs, and a description thereof will be omitted.

As illustrated in FIG. 6, the image processing device 100 refers to the map data 6 from a map database or the like. In a map database or the like, values pertaining to a target such as the lane width (the width between white lines) and curvature of each road are stored.

The target recognition unit 106 recognizes a target such as a white line on a photographed image by the camera 2, and calculates the lane width of a road during travel.

The likelihood update unit 104 compares the target recognition results of each camera 2 with values pertaining to a target in the map data 6 to determine whether or not a malfunction has occurred in the camera 2, and updates the likelihood of the photographing state of a camera 2 in which it is determined that a malfunction has occurred.

A case where the target is a road lane width will be described as an example. The likelihood update unit 104 compares, between the cameras 2, the lane widths recognized by the target recognition unit 106, and, on the basis of the comparison result, updates the likelihood of the water film-related photographing state by the cameras 2. That is, the likelihood update unit 104 compares the calculated values of the lane widths of the respective cameras 2, discriminates that there is a possibility of adhesion of the water film to a camera 2 having a lane width greater than the lane widths of the other cameras, and increases the water film likelihood of the camera 2. Furthermore, in a case where the difference, between the cameras 2, in the lane width values is small, the possibility of water film adhesion to each camera 2 is discriminated, and the calculated lane width value is compared with the lane width of the road on which the vehicle is traveling recorded in the map data 6. As a result, in a case where the values are greatly different, adhesion of a water film to each camera 2 is discriminated, and the likelihoods of the water film-related photographing state by each camera 2 are increased.

A case where the target is road curvature will be described as an example. The target recognition unit 106 calculates the curvature of the road on which the vehicle is traveling from a target such as white lines, guardrails, or curbstones. The likelihood update unit 104 compares the curvature calculation values of the respective cameras 2, discriminates the possibility of water film adhesion to a camera 2 which has a value that deviates from the values of the other cameras, and increases the likelihood of the water film-related photographing state by the cameras 2. This configuration utilizes a phenomenon where the calculated curvature value is different from the true value as a result of distortion, due to water film adhesion, of the contour of the target on the photographed image by the camera 2. Further, in a case where the difference, between the cameras 2, in the calculated curvature values is small, the calculated curvature is compared with the curvature of the road on which the vehicle is traveling recorded in the map data 6. As a result, in a case where the values are greatly different, adhesion of a water film to each camera 2 is discriminated, and the likelihoods of the water film-related photographing state by each camera 2 are increased.

Thus, by referring to the map data 6 and updating the likelihood of the water film W photographing state by the camera 2 for which there is a possibility of adhesion of the water film W, the adhesion of the water film W can be more accurately reflected in the likelihood, and thus, in the processing control by the control processing device 200, which is later-stage processing, erroneous processing control caused by the photographing state of the camera 2 can be avoided.

Fourth Embodiment

In the present embodiment, chronological water droplet changes are monitored to update the likelihood. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

Figure 7:
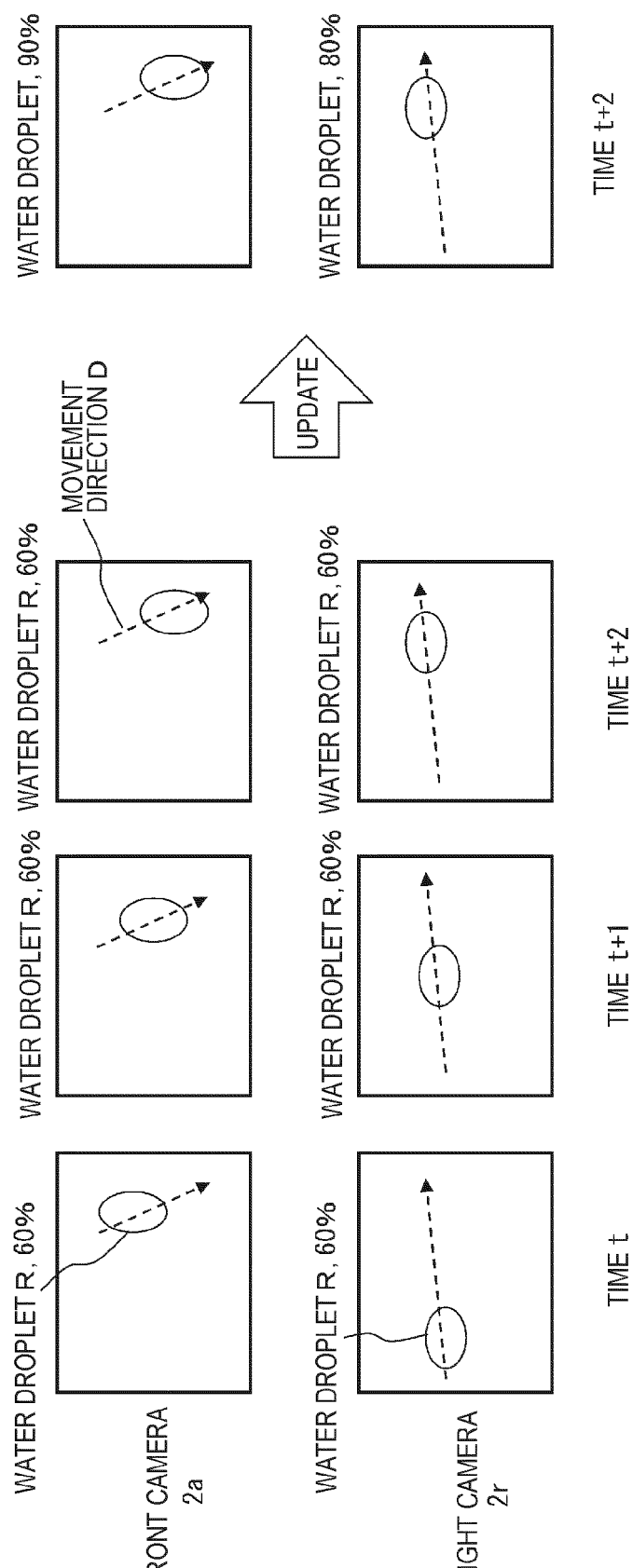
FIG. 7 is a diagram illustrating likelihood update processing by a likelihood update unit according to a fourth embodiment.

FIG. 7 is a diagram illustrating likelihood update processing by the likelihood update unit 104.

The likelihood update unit 104 monitors the chronological change of the water droplet R in the photographed image of each camera 2 detected by the photographing state detection unit 102, compares the chronological change in the water droplet R with a predefined pattern of the chronological change of the water droplet R, determines that an external factor common to each camera 2 has occurred in a case where there is a plurality of photographed images 4 camera 2 indicating the chronological change of the water droplet R similar to the pattern, and updates the likelihood of the photographing state of each camera 2 on the basis of the determined external factor. Here, the predefined pattern of the chronological change of the water droplet R is, for example, a pattern of the chronological change of the water droplet R acquired by test-driving the vehicle. The external factors common to the cameras 2 are rainfall, snowfall, and the like.

In the example of FIG. 7, the front camera 2a and the right camera 2r of the vehicle are connected to the image processing device 100. The water droplet R attached to the lenses of the front camera 2a and the right camera 2r or to the window of the vehicle appears in the photographed image, and the position of the water droplet R moves due to the wind pressure while the vehicle is traveling. Whether or not the vehicle is traveling is determined based on whether or not the value of the vehicle speed of the CAN data 4 is equal to or more than a predetermined threshold value.

Because the position of the attached water droplet R moves during vehicle travel, as the times t, t+1, and t+2 elapse, the water droplet R is detected by the photographing state detection unit 102 on the basis of the photographed image of the camera 2, and the position of the water droplet R on the photographed image by each camera 2 also moves gradually.

As illustrated in FIG. 7, the likelihood update unit 104 calculates the movement direction of the water droplet R from the movement in the position of the water droplet R on the photographed image by each camera 2 from time t to time t+2. Further, by making a comparison with the movement direction of the water droplet R in the photographed image by each camera 2 acquired in advance in a driving test or the like, it is discriminated that the water droplet R is likely to be an external factor in a case where the movement direction is close. The movement direction of the water droplet R can be calculated, for example, from the position of the water droplet R region at each time using the least squares method or the like, and whether or not the directions are close to each other is determined, for example, according to whether or not an absolute value of an inner product value of the calculated movement direction of the water droplet R and the previously acquired movement direction of the water droplet R is less than a predetermined threshold value.

In a case where there is a plurality of cameras 2 that have been discriminated as likely being the water droplet R, that is, in a case where an external factor commonly occurs for each camera 2, it is determined that the vehicle is traveling in rainy weather, for example, thus increasing the likelihood of the water droplet R photographing state by each camera 2. In the example of FIG. 7, the likelihood of the water droplet R is increased from 60% to 90% in the front camera 2a, and is increased from 60% to 80% in the right camera 2r. However, the increment of the water droplet R likelihood is an example, and an appropriate increment is determined using actual data. Note that although FIG. 7 focuses on two of the cameras 2, namely, the front camera 2a and the right camera 2r, likelihood update processing may also be implemented in a similar manner in a configuration including three or more cameras 2. In addition, although a case involving the water droplet R has been described in the present embodiment, the likelihood update processing can be similarly performed also in a case where a deposit is to move on a photographed image of the camera 2 similarly during travel, such as melted snow.

Thus, by detecting a deposit such as a water droplet R or snow moving on the photographed image of the camera 2 and updating the likelihood, the deposit can be accurately reflected in the likelihood, and thus it is possible to avoid erroneous processing control caused by the photographing state of the camera 2 in processing control by the control processing device 200, which is later-stage processing.

Fifth Embodiment

In the present embodiment, backlight is detected, and the likelihood is updated. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

Figure 8:
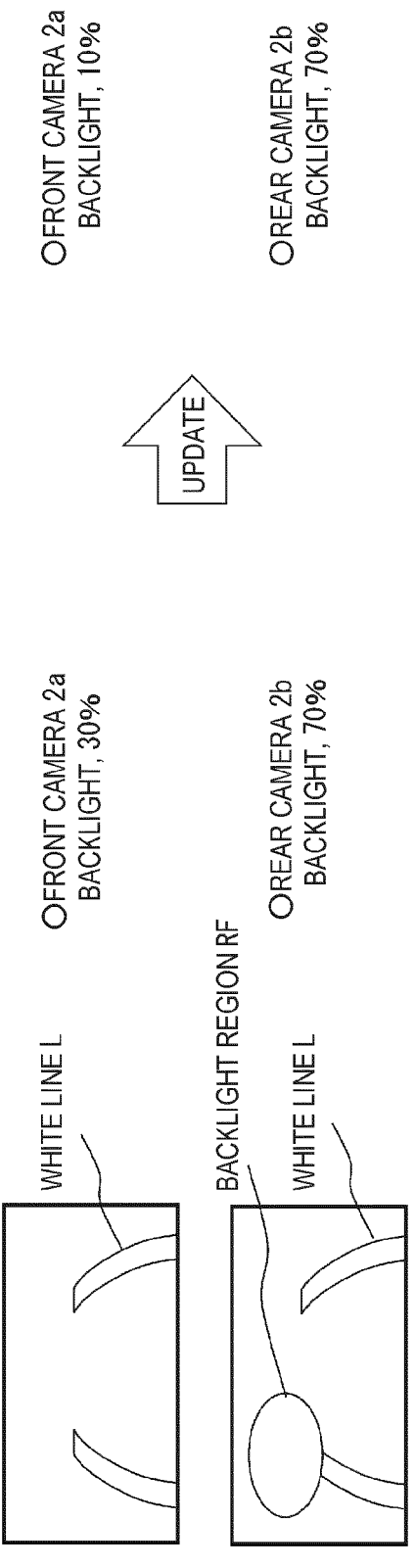
FIG. 8 is a diagram illustrating likelihood update processing by a likelihood update unit according to a fifth embodiment.

FIG. 8 is a diagram illustrating likelihood update processing by the likelihood update unit 104.

The upper diagram of FIG. 8 illustrates an example of a case where sunlight 300 is incident from the rear of the vehicle 100*a* in the daytime, and among the cameras 2, the likelihood of a backlight-related photographing state is high in the rear camera 2*b*. It is determined whether or not it is daytime from the time data 5. In the daytime, backlight is not generated in the camera 2*a*, which is installed with an orientation opposite to the orientation of the camera 2*b* in which the backlight was generated.

The lower diagram of FIG. 8 illustrates an example in which the photographed image of the front camera 2*a* includes the white line L, and the photographed image of the rear camera 2*b* includes the white line L and the backlight region RF.

The likelihood update unit 104 determines whether the backlight likelihood is equal to or more than a predetermined threshold value on the basis of the backlight region RF by the rear camera 2*b*. For instance, in this example, in a case where the threshold value is equal to or more than 70%, the possibility that backlight will be generated in the front camera 2*a* installed in the opposite direction is low is discriminated, and the likelihood of a backlight-related photographing state of the front camera 2*a* is reduced. In the example of FIG. 8, the backlight likelihood of the front camera 2*a* is reduced from 30% to 10%. The backlight likelihood of the rear camera 2*b* does not change to 70%. However, the reduction value of the backlight likelihood is an example, and an appropriate value is determined using actual data.

That is, in a case where backlight is detected as the malfunction type by the photographing state detection unit 102, the likelihood update unit 104 performs an update to reduce the likelihood of the backlight-related photographing state of the camera 2*a*, which is installed with an orientation opposite to the orientation of the camera 2*b* in which the backlight was detected. As a result, because the likelihood can be updated according to whether or not installation is oriented with a backlight orientation, even under the back-light of the camera 2, it is possible to avoid an error in processing control by the control processing device 200, which is later-stage processing.

Note that the likelihood update unit 104 may switch and update the likelihood of the photographing state according to the installation position of the camera 2 in the vehicle. For example, the likelihood of the photographing state of the rear camera 2*b* is increased more than the likelihood of the photographing state of the front camera 2*a*, or the likelihood of the photographing state of the camera positioned in the direction of travel according to forward and backward movement of the vehicle is reduced, or the likelihood of the photographing state of the camera 2 positioned in the opposite direction according to the direction and time of the vehicle is reduced.

Sixth Embodiment

In the present embodiment, the likelihood is updated by taking the highly reliable photographing state of the camera 2 as positive. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

In a case where the camera 2 is installed inside the vehicle, in particular, in a case where the camera 2 is installed inside a window with a wiper, photographing can be performed in an environment in which deposits such as water droplets, water films, mud, and snow are removed by the wiper, and a photographing state malfunction caused by the deposit is less likely to occur in comparison with the camera 2 installed outside the vehicle. That is, the photographing state by the camera 2 installed inside the vehicle is more reliable than the photographing state by the camera 2 installed outside the vehicle.

The likelihood update unit 104 determines whether a malfunction has occurred in the photographing state of the camera 2 by comparing the photographing state and the target recognition result in each camera 2 by taking, as positive, the photographing state and the target recognition result in the camera 2 installed inside the vehicle, and updates the likelihood of the photographing state by the camera 2 in which it is determined that a malfunction has occurred. Specifically, the likelihood of the photographing state by the camera 2 in which it is determined that a malfunction has occurred is increased.

In addition, even for a camera 2 installed outside the vehicle, in a case where there is a camera 2 having a wiping function for wiping a deposit such as a wiper, the likelihood update unit 104 may perform a comparison by taking, as positive, the photographing state and the target recognition result when the photographed image of the camera 2 was taken as an input, and may update the likelihood of the photographing state of each camera 2. Specifically, the likelihood of the photographing state by the camera 2 in which it is determined that a malfunction has occurred is increased.

In addition, a description will be provided for a case where there is a camera 2 installed outside or inside the vehicle, the camera 2 having a wiping function for wiping a deposit such as a wiper. In this case, the likelihood update unit 104 may receive the signal indicating the operating state of the wiping function, perform a comparison by taking, as positive, the photographing state when there is an input of a photographed image of the camera 2 within a predetermined time immediately after the wiping function operates, and update the likelihood of the photographing state of each camera 2. Specifically, the likelihood of the photographing state by the camera 2 in which it is determined that a malfunction has occurred is increased.

Alternatively, the likelihood update unit 104 may determine whether or not a malfunction has occurred in the cameras 2 by comparing the current photographed images of each camera 2 by taking, as positive, the photographed image of a camera 2 in which a malfunction has barely occurred in the past photographing state according to a preliminary test drive or the like, and may update the likelihood of the photographing state of a camera 2 in which it is determined that a malfunction has occurred. Specifically, the likelihood of the photographing state by the camera 2 in which it is determined that a malfunction has occurred is increased.

Furthermore, the likelihood update unit 104 may determine whether or not a malfunction has occurred in the camera 2 by comparing the target recognition result when the photographing state of the camera 2 was normal in the past with the current target recognition result in each camera 2, and may update the likelihood of the photographing state by the camera 2 in which it is determined that the malfunction has occurred. Specifically, the likelihood of the photographing state by the camera 2 in which it is determined that a malfunction has occurred is increased.

Thus, by comparing the photographed images by taking a highly reliable photographing state of the camera 2 as correct, the likelihood of the photographing state of the camera 2 is updated, and hence erroneous processing control caused by the photographing state of the camera 2 can be avoided in the processing control by the control processing device 200, which is later-stage processing.

Seventh Embodiment

In the present embodiment, the likelihood is updated using a target recognition result at a normal time which is pre-recorded. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

In the second embodiment, third embodiment, and sixth embodiment, the target recognition result is used to update the photographing state likelihood, but in many cases, the values of the white line width and the lane width do not change even after time has elapsed. In the present embodiment, the likelihood update unit 104 pre-records the target recognition result in a case where the photographing state is normal in the storage unit, performs a comparison with the current target recognition result by taking, as positive, the stored target recognition, and thus updates the likelihood of the photographing state of each camera 2. Specifically, the likelihood of the photographing state by the camera 2 in which it is determined that a malfunction has occurred is increased.

As described above, by using the target recognition result at a normal time which is pre-recorded, even in a case where prescribed values for the white line width and the map data 6 do not exist, the likelihood of the photographing state of the camera 2 is appropriately updated, and thus it is possible to avoid erroneous processing control caused by the photographing state of the camera 2 in the processing control by the control processing device 200, which is later-stage processing.

Eighth Embodiment

In the present embodiment, the likelihood is updated using the photographing state of the common imaging region on the photographed image. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

FIG. 9 is a diagram illustrating likelihood update processing by the likelihood update unit 104.

Among the sets of cameras 2, there may be a set for photographing a region in a common three-dimensional space depending on the installation position, the direction, and the viewing angle of the camera 2. A region in which the region appears on the photographed image by each camera 2 is referred to as a common imaging region C. Note that the common imaging region C can be calculated using the vehicle specification data 3, and actually has a complicated shape, but in FIG. 9, the common imaging region C is a rectangle to simplify the description.

In a case where there is a set of cameras 2 each having the common imaging region C on the photographed image of the camera 2 and a malfunction is detected only in the common imaging region C of one of the cameras 2, the likelihood update unit 104 performs an update to increase the likelihood of the photographing state of the one of the cameras 2.

Specifically, as illustrated in FIG. 9, a case where the front camera 2a and the right camera 2r among the cameras 2 have the common imaging region C is represented. In the right camera 2r, the water droplet R does not exist on the common imaging region C, and the photographing state of the photographed image is substantially normal at a likelihood of 10%. On the other hand, for the front camera 2a, the likelihood of the photographing state being a water droplet is high at 60%, and the water droplet R exists on the common imaging region C. When the object in the three-dimensional space is photographed on the common imaging region C, the object appears in both the common imaging region C on the photographed image of the front camera 2a and the common imaging region C of the right camera 2r. Therefore, in a case where an object appears only in one of the common imaging regions C, a high probability of a region for which there is a malfunction of the photographing state of the corresponding camera 2 is discriminated.

In the example illustrated in FIG. 9, the likelihood update unit 104 discriminates a high probability of a water droplet R appearing on the common imaging region C of the front camera 2a, and increases the likelihood of the photographing state of the front camera 2a from 60% to 80%. However, the increment of the water droplet R likelihood is an example, and an appropriate value is determined using actual data. Note that, although an example of the water droplet R is illustrated in FIG. 9, the likelihood of a malfunction may be similarly updated even in a case where a malfunction due to another type of the camera 2 occurs in the common imaging region C.

Thus, by using the photographing state of the common imaging region on the photographed image, the likelihood of the photographing state of the camera 2 is appropriately updated, and hence erroneous processing control caused by the photographing state of the camera 2 can be avoided in the processing control by the control processing device 200, which is later-stage processing.

Ninth Embodiment

In the present embodiment, the likelihood is updated using the target in the common imaging region on the photographed image. A configuration diagram of the in-vehicle control device 1000 according to the present embodiment is similar to FIG. 1 illustrated in the first embodiment, FIG. 4 illustrated in the second embodiment, or FIG. 6 illustrated in the third embodiment, and thus illustration thereof is omitted.

Figure 10:
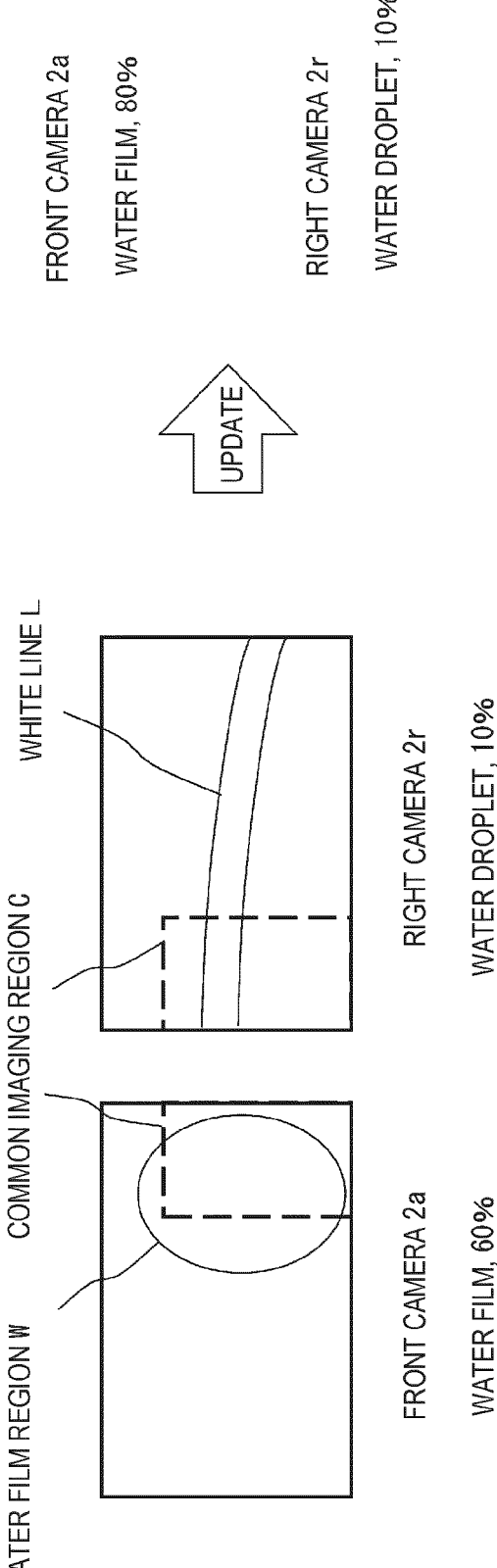
FIG. 10 is a diagram illustrating likelihood update processing by a likelihood update unit according to a ninth embodiment.

FIG. 10 is a diagram illustrating likelihood update processing by the likelihood update unit 104.

As in the case of the eighth embodiment, it is assumed that the set of cameras 2 has the common imaging region C, and FIG. 10 illustrates an example in which the common imaging region C exists in the front camera 2*a* and the right camera 2*r*.

The likelihood update unit 104 increases the likelihood of the photographing state of the camera 2 in which the target recognized by the target recognition unit 106 is not present, in a case where the target is present only in the common imaging region C of one of the cameras 2, the set of cameras 2 each having the common imaging region C on the photographed image of the camera 2.

Specifically, as illustrated in FIG. 10, in a case where the photographing states of the front camera 2*a* and the right camera 2*r* are both normal, when the target recognition unit 106 recognizes the white line L from the common imaging region C of the photographed image by the right camera 2*r*, the white line L should also be recognized from the common imaging region C of the photographed image by the front camera 2*a*. In a case where the white line L is not recognized from the common imaging region C of the photographed image by the front camera 2*a* although the white line L is recognized from the common imaging region C of the photographed image by the right camera 2*r*, the likelihood update unit 104 discriminates the possibility that a malfunction has occurred on the common imaging region C of the front camera 2*a*. However, it is not possible to specify, only based on the presence or absence of target recognition, what type of malfunction has occurred in the camera 2. Therefore, the likelihood update unit 104 increases the likelihood of each type of the front camera 2*a*. Note that the appropriate value for the likelihood increment is determined using actual data.

Thus, by using the target in the common imaging region on the photographed image, the likelihood of the photographing state of the camera 2 is appropriately updated, and hence erroneous processing control caused by the photographing state of the camera 2 can be avoided in the processing control by the control processing device 200, which is later-stage processing.

Tenth Embodiment

Figure 11:
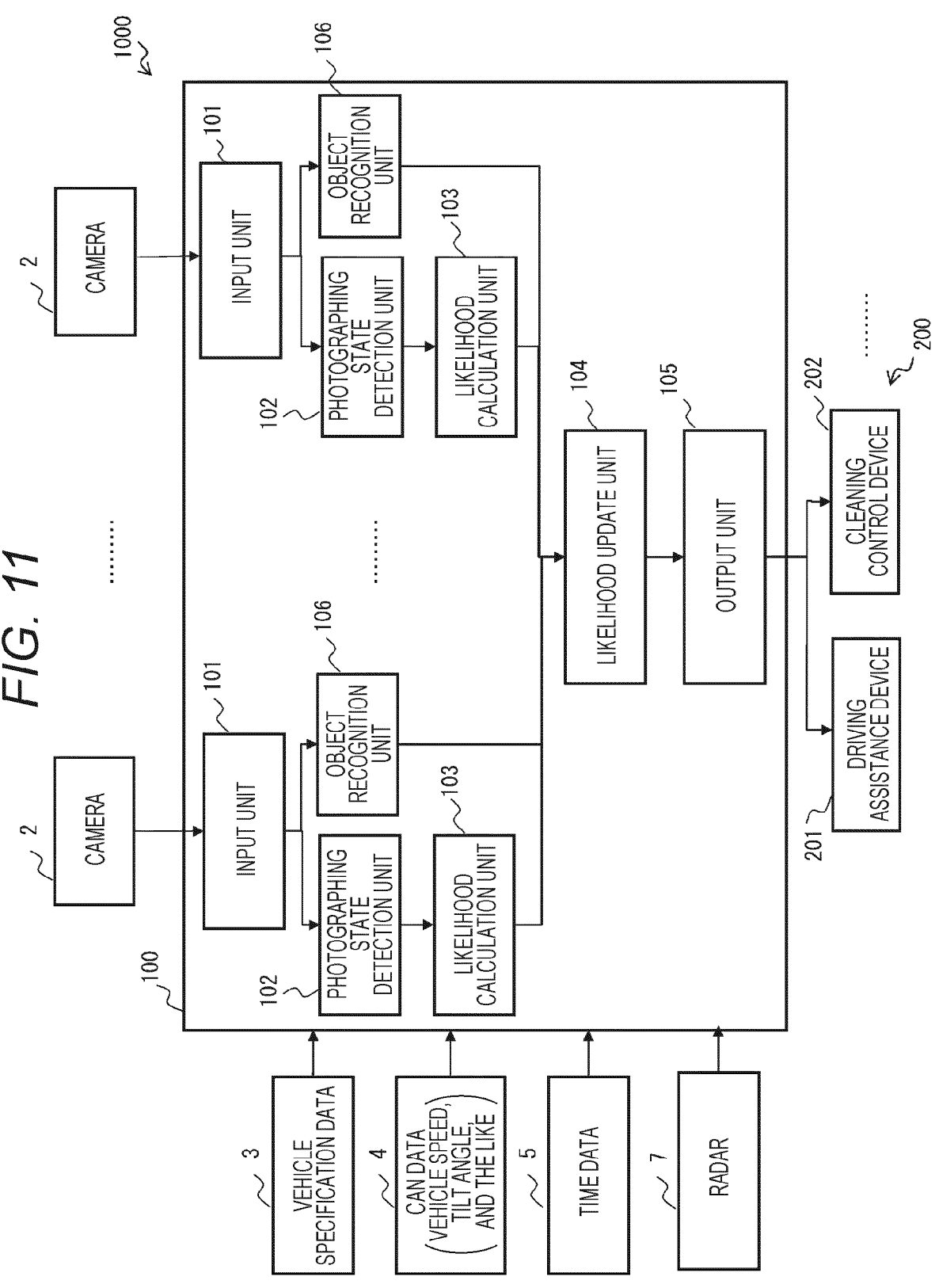
FIG. 11 is a configuration view of an in-vehicle control device according to a tenth embodiment.

FIG. 11 is a configuration view of an in-vehicle control device 1000 according to a tenth embodiment. The tenth embodiment is different from the second embodiment in that a radar 7 is provided. The same parts as those of the second embodiment illustrated in FIG. 4 are denoted by the same reference signs, and a description thereof will be omitted.

As illustrated in FIG. 11, the radar 7 is connected to the image processing device 100. The radar 7 is a three-dimensional information detection unit that detects three-dimensional information of a target that exists around the vehicle.

The likelihood update unit 104 collates the three-dimensional information on the target as detected by the three-dimensional information detection unit with the photographed images of the cameras 2, and increases the likelihoods of the photographing states of the photographed images in a case where there is no target corresponding to the three-dimensional information in the photographed images.

Specifically, as illustrated in FIG. 11, the likelihood update unit 104 compares the photographed images photographed by the cameras 2 of each target recognized by the target recognition unit 106 with the three-dimensional information on the target obtained from the radar 7. Further, in a case where there is a target that can be detected by the radar 7 but which is not present in the photographed image by the camera 2, a malfunction of the photographing state in the camera 2 that photographed the photographed image is discriminated, and the likelihood of the photographing state of the photographed image by the camera 2 is increased. Note that, because the type of malfunction cannot be identified only by comparing targets, the likelihood update unit 104 increases the likelihood for each type. Note that the appropriate value for the likelihood increment is determined using actual data. In addition, although the three-dimensional information detection unit has been described using the example of the radar 7, other means such as millimeter waves or ultrasonic waves, which enable acquisition of three-dimensional information of a target may be used.

Thus, because the likelihood of the photographing state of the camera 2 is appropriately updated by using the three-dimensional information detection unit, it is possible to avoid erroneous processing control caused by the photographing state of the camera 2 in the processing control by the control processing device 200, which is later-stage processing.

The image processing device 100 disclosed in each of the above embodiments has been described as including the input unit 101, the photographing state detection unit 102, the likelihood calculation unit 103, the likelihood update unit 104, the output unit 105, and the target recognition unit 106. However, some or all of these configurations may be realized by a processor (for example, CPU, GPU) and a program executed by the processor. Because the program is executed by the processor to perform predetermined processing while appropriately using a storage resource (for example, a memory) and/or an interface device (for example, a communication port), the subject of the processing may be the processor. Similarly, the subject of the processing performed by executing the program may be a controller, a device, a system, a computer, or a node that has a processor. The subject of the processing performed by executing the program may be an arithmetic unit, and may include a dedicated circuit (for example, an FPGA or ASIC) that performs specific processing.

The program may be installed on a device such as a computer, from a program source. The program source may be, for example, a program distribution server or a computer-readable storage medium. In a case where the program source is a program distribution server, the program distribution server may include a processor and a storage resource that stores a distribution target program, and the processor of the program distribution server may distribute the distribution target program to another computer. In addition, for the program, two or more programs may be implemented as one program, or one program may be implemented as two or more programs.

Information such as programs, tables, and files for implementing a portion or all of the configuration of the image processing device 100 can be stored on a storage device such as a memory, a hard disk, or a solid state drive (SSD), or on a recording medium such as an IC card, an SD card, or a DVD. Moreover, control lines and information lines that are considered necessary for the sake of the description are illustrated, and not all control lines and information lines required for implementation are illustrated. In practice, almost all the configurations may be considered to be interconnected.

According to the embodiments described above, the following operational effects can be obtained.

(1) The image processing device 100 includes an input unit 101 that acquires each photographed image from a plurality of cameras 2 installed in a vehicle, a photographing state detection unit 102 that detects whether a malfunction has occurred in a photographing state of each photographed image, a likelihood calculation unit 103 that calculates, for each camera 2, a likelihood indicating a degree of malfunction of the photographing state on the basis of each photographed image, and a likelihood update unit 104 that updates the likelihood to a new likelihood on the basis of a determination obtained by integrating the likelihoods for the cameras 2 calculated by the likelihood calculation unit 103, and outputs the likelihood updated by the likelihood update unit 104 as the likelihood for each camera 2. As a result, it is possible to improve the accuracy of a likelihood indicating that a malfunction has occurred in the photographing state of the photographed image by the camera.

The present invention is not limited to or by the above-described embodiments, and various modes conceivable within the scope of the technical idea of the present invention are also included within the scope of the present invention as long as the features of the present invention are not impaired. In addition, the above-described embodiments may be combined. For example, the above-described embodiments have been described in detail to facilitate understanding of the present invention, but the present invention is not necessarily limited to or by embodiments having all the configurations described. Further, a portion of the configuration of a certain embodiment may be replaced with the configuration of another embodiment. In addition, the configuration of another embodiment may be added to the configuration of a certain embodiment. Moreover, it is possible to add other configurations to a portion of the configuration of each embodiment, or to delete or replace a portion of the configuration of each embodiment.

REFERENCE SIGNS LIST 2 camera
3 vehicle specification data
4 CAN data
5 time data
100 image processing device
101 input unit
102 photographing state detection unit
103 likelihood calculation unit
104 likelihood update unit
105 output unit
200 control processing device
201 driving assistance device
202 cleaning control device
1000 in-vehicle control device

The invention claimed is:
1. An image processing device comprising:
an input unit that acquires each photographed image from a plurality of cameras installed in a vehicle;

a photographing state detection unit that detects whether a malfunction has occurred in a photographing state of each of the photographed images;
a likelihood calculation unit that calculates, for each of the cameras, a likelihood indicating a degree of malfunction of the photographing state on the basis of each of the photographed images; and
a likelihood update unit that updates the likelihood to a new likelihood on a basis of a determination obtained by integrating the likelihoods for each of the cameras calculated by the likelihood calculation unit, wherein
the likelihood updated by the likelihood update unit is outputted as the likelihood for each of the cameras.

2. The image processing device according to claim 1, further comprising a target recognition unit that recognizes a target present on each of the photographed images from the plurality of cameras,
wherein the likelihood update unit updates the likelihood by comparing, between the cameras, recognition results of the target by the target recognition unit.

3. The image processing device according to claim 2, wherein the likelihood update unit determines whether or not a malfunction has occurred in the camera, on the basis of the target recognition results compared between the cameras, and updates the likelihood of the photographing state of the camera in which it is determined that the malfunction has occurred.

4. The image processing device according to claim 1, wherein the photographing state detection unit detects a malfunction of the camera on the basis of the photographing state and discriminates a type of the malfunction, and
wherein the likelihood calculation unit calculates a likelihood of the malfunction for each type of the malfunction.

5. The image processing device according to claim 1, wherein the photographing state detection unit detects a malfunction of the camera on the basis of the photographing state, and
wherein the likelihood update unit monitors a chronological change in the photographing state of each camera detected by the photographing state detection unit, compares the chronological change in the photographing state with a pattern of chronological change pertaining to a predetermined malfunction to determine that an external factor common to each camera has occurred, and updates the likelihood of the photographing state of each camera on the basis of the determined external factor.

6. The image processing device according to claim 4, wherein, in a case where there is a plurality of cameras in which a malfunction of the same type is detected by the photographing state detection unit, the likelihood update unit updates the likelihood of the photographing state of each camera.

7. The image processing device according to claim 3, wherein the likelihood update unit determines whether or not a malfunction has occurred in the camera by comparing the target recognition results of each of the cameras with a value pertaining to a map data target, and updates the likelihood of the photographing state of a camera in which it is determined that the malfunction has occurred.

8. The image processing device according to claim 4, wherein, in a case where backlight is detected as the malfunction type by the photographing state detection unit, the likelihood update unit performs an update to reduce the likelihood of the backlight-related photographing state of the camera, which is installed with an orientation opposite to the orientation of the camera in which the backlight was detected.

9. The image processing device according to claim 3, wherein the likelihood update unit determines whether or not a malfunction has occurred in the camera by taking, as positive, the photographing state and the target recognition result of the camera installed inside the vehicle and comparing the photographing states and the target recognition results of each of the cameras, and updates the likelihood of the photographing state of a camera in which it is determined that the malfunction has occurred.

10. The image processing device according to claim 3, wherein the likelihood update unit determines whether or not a malfunction has occurred in the cameras by taking, as positive, the photographing states and the target recognition results of each of the cameras, among the cameras, which are equipped with a wiping function for wiping off a deposit and comparing the photographing states and the target recognition results of the cameras, and updates the likelihood of the photographing state of a camera in which it is determined that the malfunction has occurred.

11. The image processing device according to claim 3, wherein the likelihood update unit determines whether or not a malfunction has occurred in the camera by taking, as positive, a photographed image of a camera in which a malfunction has barely occurred in past photographing states and comparing that photographed image with a current photographed image of each of the cameras, and updates the likelihood of the photographing state of a camera in which it is determined that the malfunction has occurred.

12. The image processing device according to claim 3, wherein the likelihood update unit determines whether or not a malfunction has occurred in the camera by taking, as positive, a recognition result of the target when the photographing state of the camera was previously normal and comparing that recognition result with a current recognition result of the target for each camera, and updates the likelihood of the photographing state of a camera in which it is determined that the malfunction has occurred.

13. The image processing device according to claim 4, wherein, in a case where the camera is a set of cameras each having a common imaging region on the photographed image of the camera and where a malfunction is detected only in the common imaging region of one of the cameras, the likelihood update unit performs an update to increase the likelihood of the photographing state of the one camera.

14. The image processing device according to claim 3, wherein, in a case where the camera is a set of cameras each having a common imaging region on the photographed image of the camera and where a target recognized by the target recognition unit exists only in the common imaging region of one of the cameras, the likelihood update unit increases the likelihood of the photographing state of the cameras in which the target does not exist.

15. The image processing device according to claim 1, further comprising a three-dimensional information detection unit that detects three-dimensional information of a target existing around the vehicle, wherein the likelihood update unit collates three-dimensional information of the target detected by the three-dimensional information detection unit with the photographed image of the camera, and increases the likelihood of the photographing state of the photographed image in a case where there is no target corresponding to the three-dimensional information in the photographed image.

16. The image processing device according to claim 1, wherein the likelihood update unit updates the likelihood of the photographing state by switching the likelihood according to the installation positions of the cameras.

17. The image processing device according to claim 3, wherein the likelihood update unit compares, between the cameras, the width of the white line recognized by the target recognition unit, and, on the basis of the comparison result, updates the likelihood of the photographing state pertaining to a water film of the camera.

18. The image processing device according to claim 3, wherein the likelihood update unit compares, between the cameras, a lane width recognized by the target recognition unit, and, on the basis of the comparison result, updates the likelihood of the photographing state pertaining to a water film of the camera.

19. The image processing device according to claim 7, wherein the likelihood update unit compares, between the cameras, the curvature of the roadway during travel, the curvature being calculated from a target recognized by the target recognition unit and, on the basis of the comparison result, updates the likelihood of a water film of the camera.

20. The image processing device according to claim 5, wherein the likelihood update unit monitors a chronological change in a water droplet in a photographed image of each camera detected by the photographing state detection unit, compares the chronological change in the water droplet with a predefined pattern of the chronological change in the water droplet, determines that an external factor common to each camera has occurred in a case where there is a plurality of photographed images of the camera indicating the chronological change in the water droplet similar to the pattern, and updates the likelihood of the photographing state by each camera on the basis of the determined external factor.

21. An in-vehicle control device comprising:
the image processing device according to claim 1; and
a control processing device that executes processing control based on the likelihood updated by the likelihood update unit.

22. The in-vehicle control device according to claim 21, wherein the control processing device is a driving assistance device, and
wherein the driving assistance device executes driving assistance processing control in a case where the updated likelihood is lower than a threshold value.

23. The in-vehicle control device according to claim 21, wherein the control processing device is a cleaning control device, and
wherein, in a case where the updated likelihood is higher than a threshold value, the cleaning control device executes control for cleaning an optical system input/output device provided to the vehicle.

* * * * *